(12) United States Patent
Lekki et al.

(10) Patent No.: US 7,574,137 B1
(45) Date of Patent: Aug. 11, 2009

(54) MULTI-WAVELENGTH TIME-COINCIDENT OPTICAL COMMUNICATIONS SYSTEM AND METHODS THEREOF

(75) Inventors: John Lekki, Elyria, OH (US);
Quang-Viet Nguyen, Richmond Heights, OH (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 392 days.

(21) Appl. No.: 11/418,304

(22) Filed: May 5, 2006

(51) Int. Cl.
*H04J 14/02* (2006.01)
*H04B 10/142* (2006.01)
(52) U.S. Cl. ........................ 398/91; 398/163
(58) Field of Classification Search ............... 398/91, 398/163
See application file for complete search history.

(56) References Cited

U.S. PATENT DOCUMENTS

| | | | | |
|---|---|---|---|---|
| 5,404,402 A * | 4/1995 | Sprunk | ..................... | 713/189 |
| 5,418,905 A * | 5/1995 | Rarity et al. | ................. | 398/40 |
| 5,757,912 A * | 5/1998 | Blow | ........................ | 380/256 |
| 6,748,083 B2 * | 6/2004 | Hughes et al. | ............. | 380/278 |
| 6,897,434 B1 * | 5/2005 | Kumar et al. | ......... | 250/227.18 |
| 7,106,971 B1 * | 9/2006 | Davis | ....................... | 398/125 |

FOREIGN PATENT DOCUMENTS

WO     WO 0106663 A2 *   1/2001

OTHER PUBLICATIONS

Advanced Research and Development Activity (ARDA). "A Quantum Information Science and Technology Roadmap—Part 2: Quantum Cryptography". Jul. 19, 2004. viewed on Nov. 7, 2008 <http://qist.lanl.gov/pdfs/whole_roadmap.pdf>.*
Hong, C.K. et al. "Optical communication channel based on coincident photon pairs". Applied Optics, vol. 24, No. 22, Nov. 15, 1985: 3877-3882.*
Lekki, J.D. et al. "Quantum Optical Communication for Micro Robotic Explorers". Proceedings of the American Institute of Aeronautics and Astronautics (AIAA), AIAA 2005-7118, Sep. 26-29, 2005: 1925-1933.*
Mandel, L. "Proposal for almost noise-free optical communication under conditions of high background". Journal of the Optical Society of America B, vol. 1, No. 1, Mar. 1984: 108-110.*

(Continued)

*Primary Examiner*—Leslie Pascal
(74) *Attorney, Agent, or Firm*—Mark Homer

(57) ABSTRACT

An optical communications transmitter includes a oscillator source, producing a clock signal, a data source, producing a data signal, a modulating circuit for modulating the clock signal using the data signal to produce modulating signals, optical drivers, receiving the modulating signals and producing optical driving signals based on the modulating signals and optical emitters, producing small numbers of photons based on the optical driving signals. The small numbers of photons are time-correlated between at least two separate optical transmission wavelengths and quantum states and the small number of photons can be detected by a receiver to reform the data signal.

24 Claims, 5 Drawing Sheets

OTHER PUBLICATIONS

Rarity, J.G. and P.R. Tapster. "Quantum communications". Applied Physics B: Lasers and Optics, vol. 55, No. 3, Sep. 1992: 298-303.*

Sackinger, E. Broadband Circuits for Optical Fiber Communication. Hoboken, New Jersey: John Wiley & Sons, Inc., 2005.*

Seward, S.F. et al. "Daylight demonstration of a low-light-level communication system using correlated photon pairs". Quantum Optics: Journal of the European Optical Society Part B, vol. 3, No. 4, Aug. 1991: 201-207.*

Van Der Tang, J. et al. High-Frequency Oscillator Design for Integrated Transceivers. Dordrecht: Kluwer Academic Publishers, 2003.*

* cited by examiner

MULTI-WAVELENGTH TIME-COINCIDENT OPTICAL COMMUNICATIONS SYSTEM AND METHODS THEREOF

ORIGIN OF THE INVENTION

The invention described herein was made by employees of the United States Government and may be manufactured and used by or for the Government for Government purposes without payment of any royalties thereon or therefore.

BACKGROUND OF THE INVENTION

1. Field of Invention

The present invention relates to systems for optical communication that utilize low power requirements and have a low error rate. In particular, the present invention is directed to methods of using sets of photons with orthogonal properties and their associated quantum states to achieve such communications. In specific embodiments, the invention allows for the use of two photons per bit and time correlation of the same to provide improved noise immunity.

2. Description of Related Art

In the field of free-space communications there exists a need for the transmission and receipt of information over a noisy ambient or background noise source using ultra low power. Whether the communication system uses radio waves (having centemeter to meter wavelengths) or photons (having nanometer to micrometer wavelengths), the fundamental limitation of signal-to-noise ratio (SNR) versus a given, required data transmission rate arises when radiated power is limited and background noise sources are high.

In the area of communications between micro-devices, such as micro-robots or micro-transceivers that have power budgets on the order of microWatts or nanoWatts, the radiated power cannot exceed a given power budget. In order to increase the data transmission rate or throughput, a way of increasing the SNR without increasing the required radiated power is required. In addition, micro-devices also have another primary limitation in that the physical size of the transceiver must be very small. The size of these micro-devices can be on the order of ten square micrometers to one square millimeter.

In order for a data transmitter to be useful for micro-devices, it must be small, i.e., on the order of tens of micrometers to 1 mm, and require very little power (less than micro-Watts). Furthermore, it must enable a reliable data transmission rate of at least 1 kHz over a distance of at least 100 m, for specific applications. Because of the small size of the devices, it is very difficult to communicate at Radio Frequency wavelengths. This is because the conversion efficiency of electrical energy to radiated electromagnetic energy drops significantly when the RF radiating device is smaller than one quarter of the wavelength of the radio waves, which is the case for micro to millimeter devices. This implies that the portion of the electromagnetic spectrum that should be used for efficient energy conversion is in the optical region. Prior art systems include that optical communication include quantum communication systems that generate photons that share a quantum state, or in other words are entangled.

It also includes optical communication systems based on lasers and single frequency transmissions. Very small communication devices discussed in the prior art are, in general, devices that transmit information at radio frequencies (usual frequencies: 10 KHz to 10 MHz). Previous systems that utilize entangled photon transmission are complicated large-scale systems requiring a ultraviolet (UV) pump laser to excite a non-linear crystal to produce time-coincident photons. Prior art optical communication systems employing photons for both free-space and fiber optic Quantum Key communications have been demonstrated. These systems typically utilize a bright, higher power, synchronization laser in conjunction with a low power photon source. See, for example, "Present and Future Free-Space Quantum Key Distribution," Nordholt et Al., SPIE Conference: Free-Space LASER Communications Technologies XIV, 20-25 JAN 2002, San Jose, Calif. Such systems are not, however, applicable to the low power and small size devices discussed herein.

As such, there is a need for a system that is physically small and able to provide communications at ultra low power levels. There is also a need for systems that provide communications at sufficiently high SNR that can operate with constrained power budgets.

SUMMARY OF THE INVENTION

According to one embodiment of the invention, an optical communications transmitter includes an oscillator source, producing a clock signal, a data source, producing a data signal, a modulating circuit for modulating the clock signal using the data signal to produce modulating signals, optical drivers, receiving the modulating signals and producing optical driving signals based on the modulating signals and optical emitters, producing small numbers of photons based on the optical driving signals. The small numbers of photons are time-correlated between at least two separate optical transmission wavelengths and quantum states and the small number of photons can be detected by a receiver to reform the data signal.

Additionally, the transmitter may be configured to transmit the small number of photons to the receiver through a polarization maintaining fiber or through free space. The optical emitters may be at least one of light emitting diodes, laser diodes, quantum wells and quantum dots. The transmitter may also include a random signal generator, where the clock signal is received by the random signal generator and produces a randomized clock signal to be provided to the modulating circuit and the small number of photons are pseudo-entangled photons.

Additionally, the optical emitters may produce the small numbers of photons which have both horizontal and vertical polarization states. Additionally, the optical emitters may produce the small number of photons having two wavelengths, with photons of a first wavelength of the two wavelengths having a single polarization state or having both horizontal and vertical polarization states. The small number of photons and the noise immunity from time coincident transmission of the photon pair enable ultra low power communication between the transmitter and the receiver.

According to another embodiment, a method of ultra lower power communication between a transmitter and receiver. The method includes modulating a clock signal using a data signal to produce modulating signals, driving optical emitters, based on the modulating signals, to produce small numbers of photons, transmitting the small number of photons to a receiver and detecting the small number of photons to reform the data signal. The small numbers of photons are time-correlated over at least two wavelengths and quantum states.

According to another embodiment, a system for ultra lower power communication between a transmitter and receiver includes modulating means for modulating a clock signal using a data signal to produce modulating signals, driving means for driving optical emitters, based on the modulating signals, to produce small numbers of photons, transmitting means for transmitting the small number of photons to a receiver and detecting means for detecting the small number of photons to reform the data signal. The transmitter is configured to produce the small numbers of photons which are time-correlated between at least two separate optical transmission wavelengths and quantum states.

These and other variations of the present invention will be described in or be apparent from the following description of the preferred embodiments.

BRIEF DESCRIPTION OF THE DRAWINGS

For the present invention to be easily understood and readily practiced, the present invention will now be described, for purposes of illustration and not limitation, in conjunction with the following figures.

DETAILED DESCRIPTION OF PREFERRED EMBODIMENTS

According to several embodiments, communication systems that require ultra low power are described. The systems are physically small and able to provide communications at ultra low power levels. The use of time-coincident photons provides communications at sufficiently high SNR that can operate with constrained power budgets.

One purpose of the present invention is to provide an optical transmitter that will meet the power and size requirements for a micro robotic device. This means that the transmitter is in the order of 10×10 microns in area, and require less than a micro-watt of power. This transmitter sends very low power optical pulses on a number of optical frequencies. The pulses are time coincident to within less than 1 ns apart. This time coincidence decreases the power required to get a certain level of signal to noise ratio.

Figure 1:
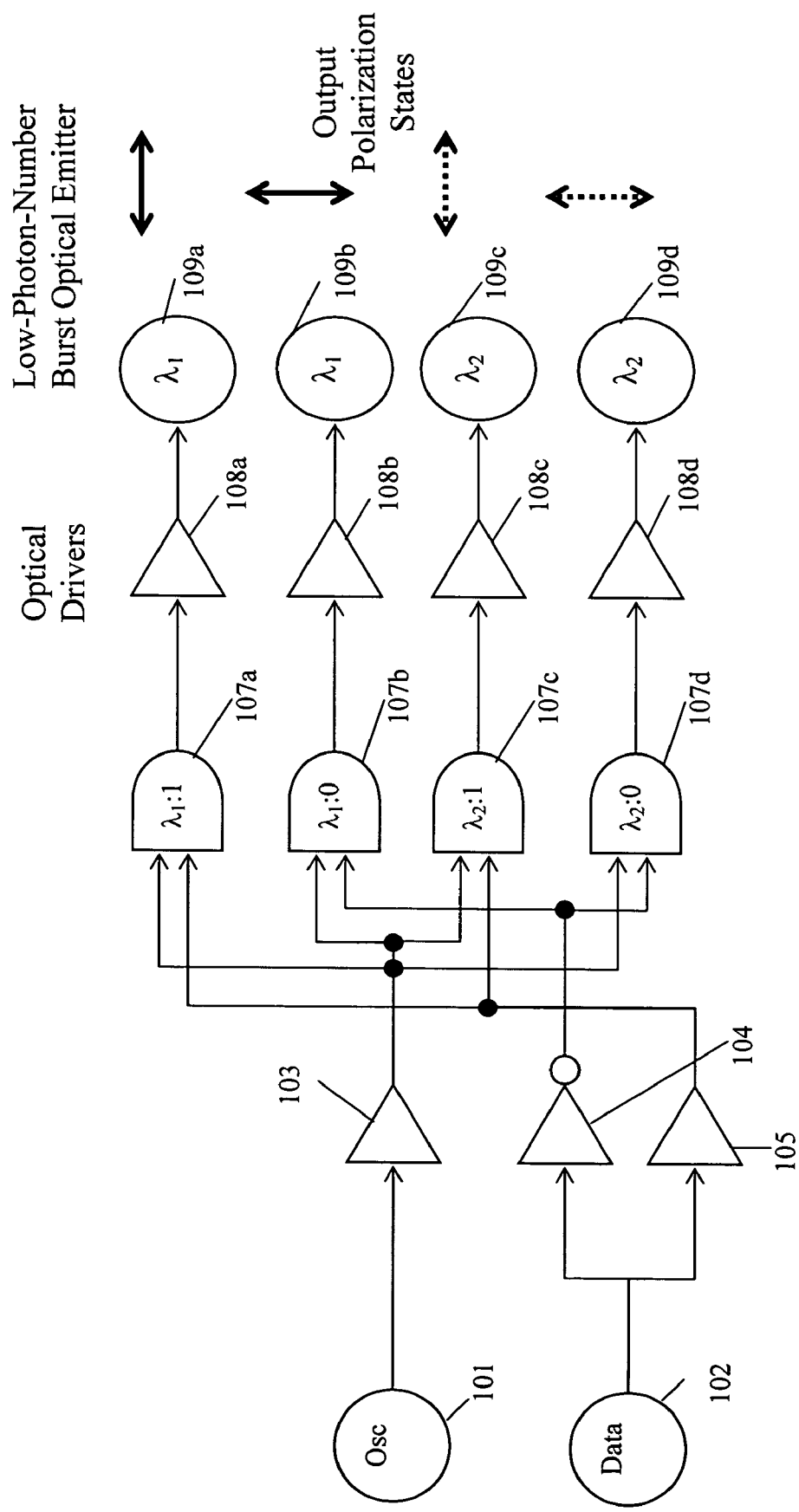
FIG. 1 provides a logic diagram for a multi-wavelength time coincident optical transmitter, according to one embodiment of the present invention.

A block diagram for one embodiment of the present invention is provided in FIG. 1. The device works by modulating a signal from an oscillator 101 or clock, for example at a 1 GHz rate. This modulated signal drives optical sources 109 of different wavelengths through buffers 103, 104 and 105. These sources 109 (which may be LEDs, Laser Diodes, Quantum Wells or Quantum Dots) are driven with very small and very fast pulses of electrical energy so that a burst of photons numbering less than one thousand per source are generated. The data 102 is used in conjunction with the oscillator signal to produce four signals 107 that are fed to the optical drivers 108.

The oscillator 101 provides a steady stream of alternating low(0) and high(1) digital clock pulses at, for example, 1 GHz. The data stream is the sent to the appropriate AND gates 107 which then determines which optical emitter 109 to fire. The optical emitters can be, but are not limited to light emitting diodes (LED) or diode lasers, quantum-dots, etc. Depending on the emitter that is fired, each has a certain wavelength or spectral channel and a polarizer associated with it. In this way, both wavelength and polarization states are used to effectively increase the SNR for single-photon data transmissions.

By generating very small numbers of photons, the required power is significantly reduced from that of traditional On/Off Keyed optical transmitters. The photons from all four optical emitters are then sent coaxially along the same optical path to a receiver whereby they are decoded according to wavelength and polarization state. Various optical configurations can be used to spatially superimpose the signals from all emitters along a common optical path, including, but not limited to, dichroic beamsplitters and/or polarizing beam splitters, or a combination of a diffractive element such as a prism or grating and polarizers. Table 1 provides a truth table defining the way in which the information bits can be encoded, according to one embodiment of the present invention.

TABLE 1

| Oscillator (Clock) | Data Input | Optical Output ($\lambda$, polarization) |
|---|---|---|
| 0 | any | 0 |
| 1 | 0 | $\lambda_1$ Vertical, $\lambda_2$ Vertical |
| 1 | 1 | $\lambda_1$ Horizontal, $\lambda_2$ Horizontal |

According to Table 1, when the receiver counts photons from wavelengths $\lambda_1$ and $\lambda_2$ in temporal coincidence that have identical and vertical polarizations then information bit is a "0." When the receiver counts photons that are in horizontal polarization states, then the information bit is a "1." Of course, other polarization coding schemes can be employed to achieve the same effect, such as orthogonal polarizations for a "0" and identical polarizations for a "1" and vice versa. It is noted that by use of additional logic gates, a system can be devised to send up to 2 bits ($2^2$) of data to yield a possible of 4 combinations versus the 2 possible combinations shown in Table 2.

TABLE 2

| Oscillator (Clock) | Data Input | Optical Output ($\lambda$, polarization) |
|---|---|---|
| 0 | any | 0 |
| 1 | 0, 0 | $\lambda_1$ Vertical, $\lambda_2$ Horizontal |
| 1 | 1, 0 | $\lambda_1$ Horizontal, $\lambda_2$ Vertical |
| 1 | 0, 1 | $\lambda_1$ Vertical, $\lambda_2$ Vertical |
| 1 | 1, 1 | $\lambda_1$ Horizontal, $\lambda_2$ Horizontal |

For the communication schemes shown Table 1 and Table 2, only two photons, one at each wavelength, have to be captured by the receiver. Since only two photons have to make it to the receiver, this implies that very few photons must be transmitted from the transmitter. The actual number of photons transmitted depends on the receiver size and quantum efficiency, the distance of the transmission and the directional capability of the transmitter.

Figure 2:
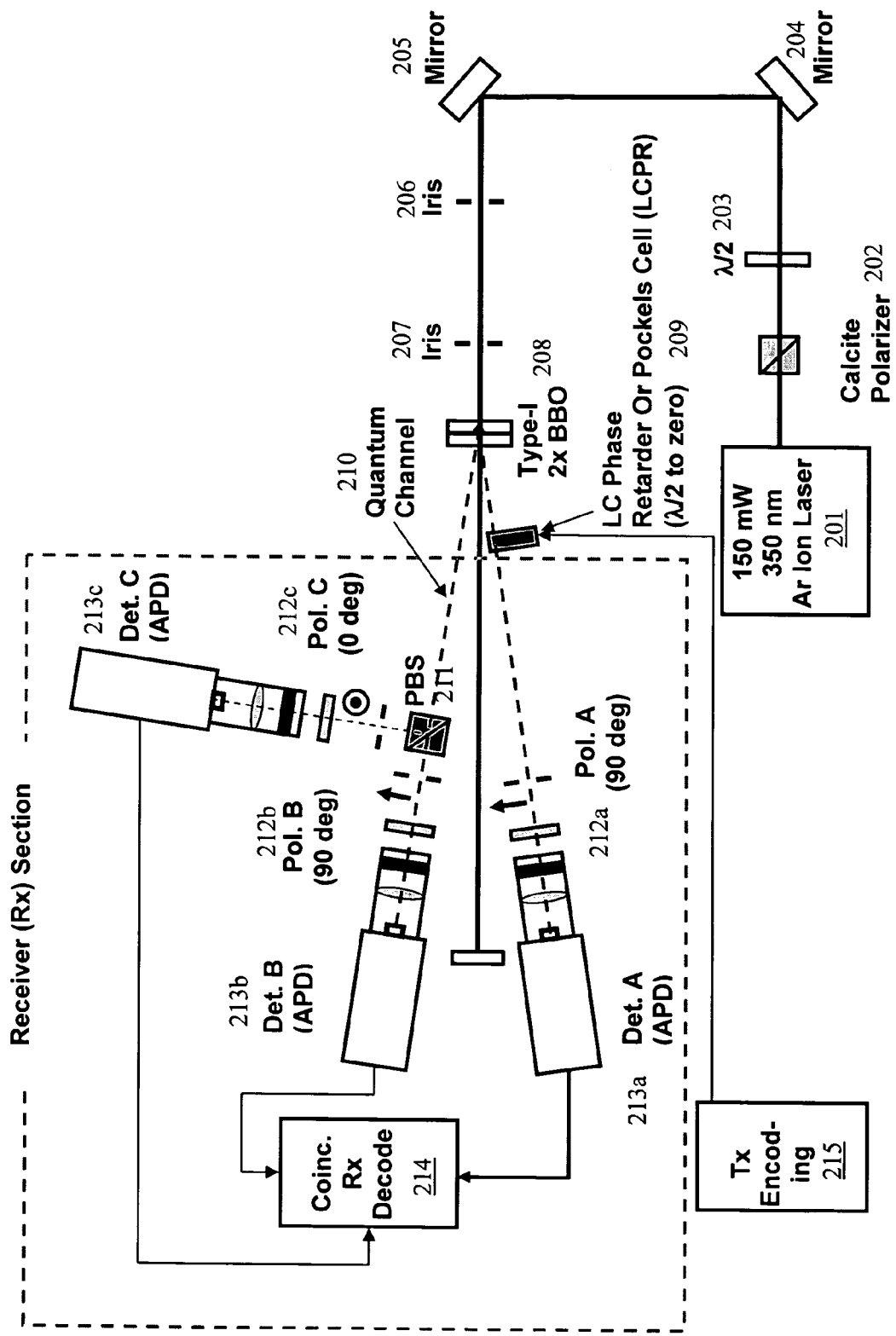
FIG. 2 provides an example of an experimental setup that confirms the use of a two state communications protocol, according to one embodiment of the present invention.

The above-discussed system has also been demonstrated in an alternate configuration. The demonstrated system is illustrated in FIG. 2. This system has been used to verify the communications protocol. The theory behind this protocol was first reported by L. Mandel in "Proposal for almost noise-free optical communication under conditions of high background," Journal of the Optical society of America, Volume 1, No. 1, March 1984. The present invention extends this theory and applies it as discussed below.

The experiment that confirms the two state communication protocol is illustrated in FIG. 2. In this arrangement, pairs of single photons are generated by an ultraviolet (UV) Ar-ion laser 201 (351 nm) that pumps a pair of thin orthogonal type-I BBO crystals 208 cut for the production of degenerate wavelength photons. In the experiment, a calcite polarizer 202, a half wave plate 203, mirrors 204 and 205 and irises 206 and 207 are used to produce the input beam. The photon pairs are generated in either crystal with an equal probability by aligning the pump polarization to be 45 degrees with respect to the crystal axis. The photon pairs are produced by a process called spontaneous parametric down conversion (SPDC) that produces two photons of random but identical polarizations: either vertical (V) or horizontal (H). The photon pair then is directed to a set of avalanche photo diode (APD) single photon detectors 213 fitted with narrow bandpass filters 212 centered at the degenerate SPDC photon wavelength of 702 nm, in one example. On one path, the quantum channel 210, a polarizing beam splitter (PBS) 211 splits the V and H photons into separate detectors. On the other path, an electronically controlled liquid crystal phase retarder (LCPR) 209 is used to apply a λ/2 phase shift to rotate the polarization by 90 degrees. The LCPR when activated, produces a photon pair with orthogonal polarization states. Temporal coincidences between detector A and B (same polarizations) produce a transmitted logical "0" state; whereas coincidences between detectors A and C (orthogonal polarizations) produce a transmitted logical "1" state. Those coincidences are decoded in the module 214. Thus, by modulating the LCPR, through the encoding module 215, logical states of "0" and "1" can be unambiguously transmitted using pairs of single photons which correspond to attoWatt levels of optically transmitted power.

Figure 3:
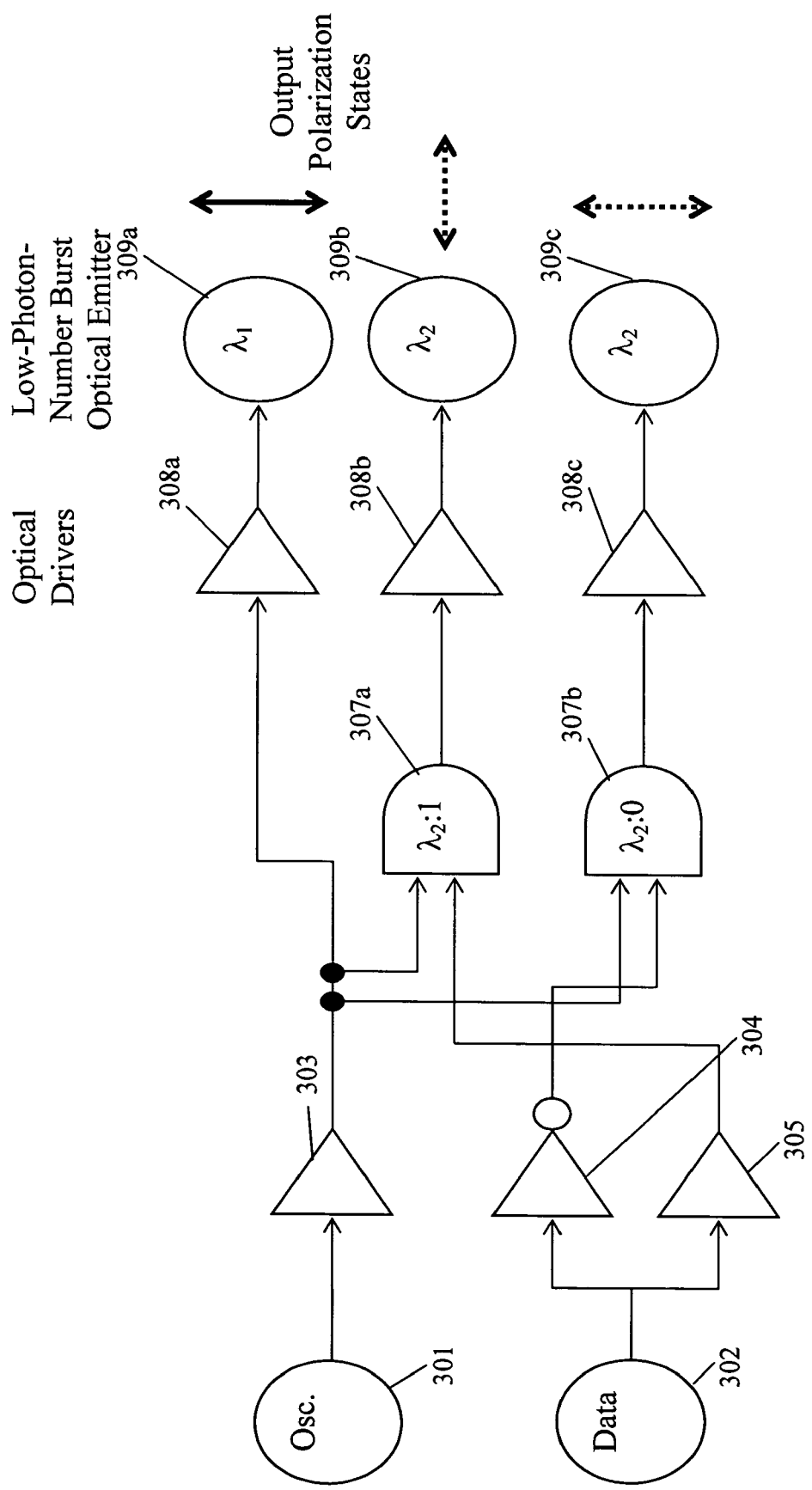
FIG. 3 provides a logic diagram for an optical transmitter, according to an alternate embodiment of the present invention.
Figure 4:
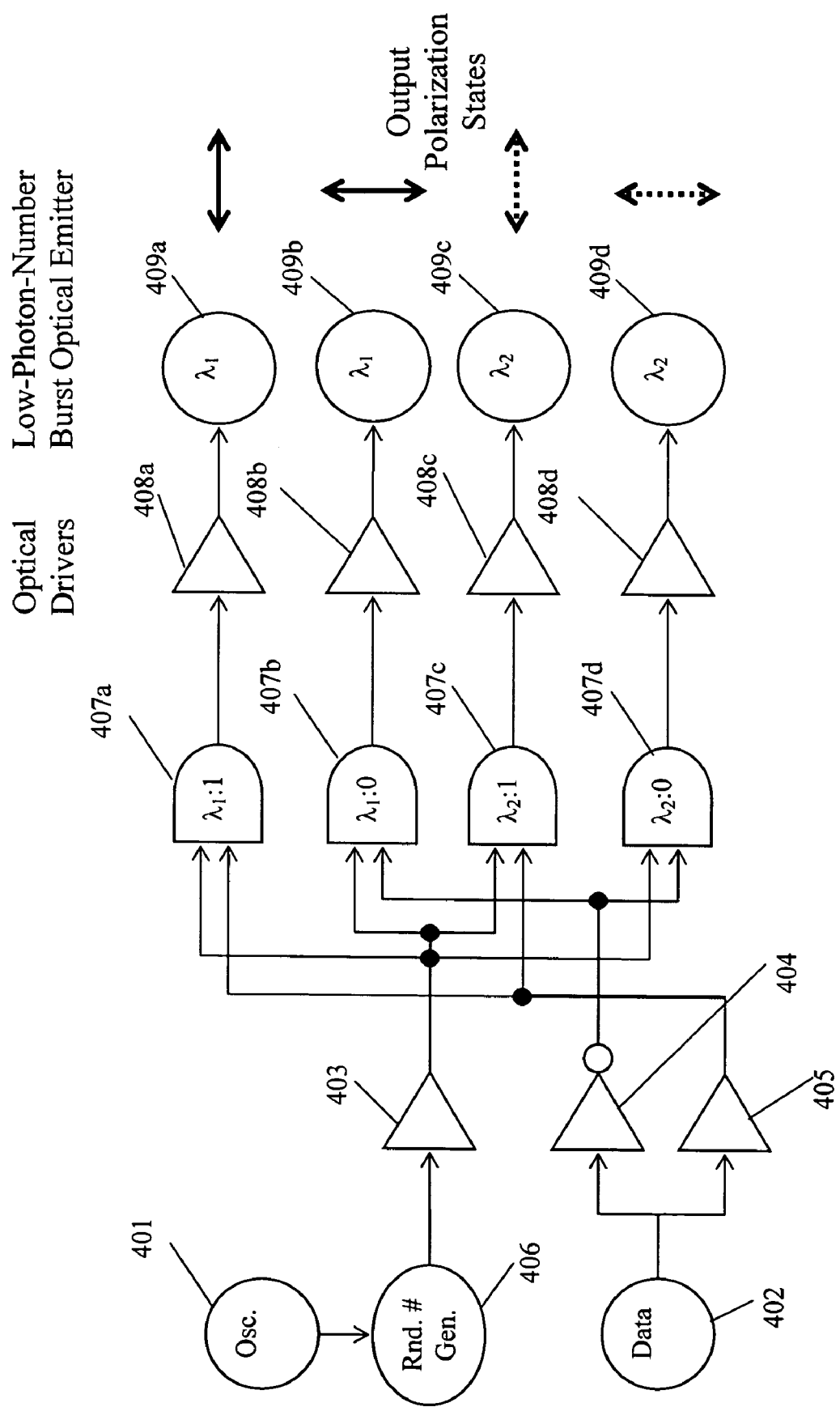
FIG. 4 provides a logic diagram for an optical transmitter using a binary random number generator, according to an alternate embodiment of the present invention.

Alternate embodiments of the present invention are shown in FIGS. 3 and 4. FIG. 3 shows the schematic of a transmitter that utilizes three optical channels with the data being encoded on one wavelength while a timing pulse is sent on another spectral channel. Here, the emitter that is of wavelength 1 provides synchronization and a reference polarization. This emitter has a fixed wavelength and polarization. The second set of emitters is of a different wavelength then the sync emitter. The data 302 is sent to buffers 304 and 305 and is used in conjunction with the oscillator signal 301, buffered by 303, to produce signals 307. The output signals are used by the optical divers 308 to produce photons by the single-photon optical emitters 309.

The data is encoded by the relative polarization of the emitter that is fired from the second wavelength when compared to the reference emitter polarization. When the emitter of wavelength 2 that is fired is the same polarization as the wavelength 1 emitter then this encodes a zero bit. When the emitter of wavelength 2 that is fired has a different polarization than the wavelength 1 emitter then this encodes a one bit. The logic chart or truth table for FIG. 3 is shown in Table 3.

TABLE 3

| Oscillator (Clock) | Data Input | Optical Output (λ, polarization) |
|---|---|---|
| 0 | any | 0 |
| 1 | 0 | $\lambda_1$ Vertical, $\lambda_2$ Vertical |
| 1 | 1 | $\lambda_1$ Vertical, $\lambda_2$ Horizontal $\lambda_1$ |

FIG. 4 shows a schematic of a pseudo-entangled photon source that can be used to send highly time-correlated data that appears to be a random stream of polarization states for any given channel, according to an alternate embodiment of the present invention. However, in coincidence, the data can be decoded due to the high degree of time-correlation, i.e. similar to quantum entangled systems that employ spontaneous parametric down conversion (SPDC) in a non-linear crystal.

In this alternate embodiment, shown in FIG. 4, a binary random number generator 406 is used to produce a pseudo-entangled photon state in which the output polarization states of each spectral channel when viewed independently appear random, but when viewed in time-coincidence with one another are highly correlated with the following wavefunction: $\Psi=|H_1,H_2\rangle\pm|V_1,V_2\rangle$. The wavefunction is states that the polarizations of each spectral channel will be correlated to the other spectral channel identically. That is, if a vertical state is measured on channel 1 ($V_1$), then within the coincidence window time dictated by the gate logic and oscillator clock speed, the polarization state of channel two will also be vertical ($V_2$), and vice versa. The data 402 is sent to buffers 404 and 405 and is used in conjunction with the oscillator signal 401, fed to the random number generator 406 and buffered by 403, to produce signals 407. The output signals are used by the optical divers 408 to produce photons by the single-photon optical emitters 409.

Truth table or logic chart for the embodiment is shown in FIG. 4. Information can be sent through a pseudo-entangled state so that it appears to be random unless time-coincident techniques are used on both channels 1 and 2. This permits the transmission of data through a secure channel via one spectral channel, while the other channel is sent to self (the sender) to record the random timing information. This information is then sent separately through classical channels to permit the decryption of the first channel sent via optical means.

TABLE 4

| Oscillator (Clock) | Data Input | Optical Output (λ, polarization) |
|---|---|---|
| 0 | any | 0 |
| 1 | 0, 0 | $\lambda_1$ Vertical, $\lambda_2$ Horizontal |
| 1 | 1, 0 | $\lambda_1$ Horizontal, $\lambda_2$ Vertical |
| 1 | 0, 1 | $\lambda_1$ Vertical, $\lambda_2$ Vertical |
| 1 | 1, 1 | $\lambda_1$ Horizontal, $\lambda_2$ Horizontal |

With respect to all of the embodiments of the present invention, the optical sources must be of narrow wavelength, i.e. <2 nm, and have an optical lifetime for the radiative state that is less than 1 ns. This is equivalent to an entanglement time of 1 ns and provides a maximum data transmission rate of 1 GHz assuming no dead-time between received pulses of the single-photon detectors. However, with current detectors, the detector dead-time is of the order 40 ns which can limit the maximum data rate to 25 MHz.

Figure 5:
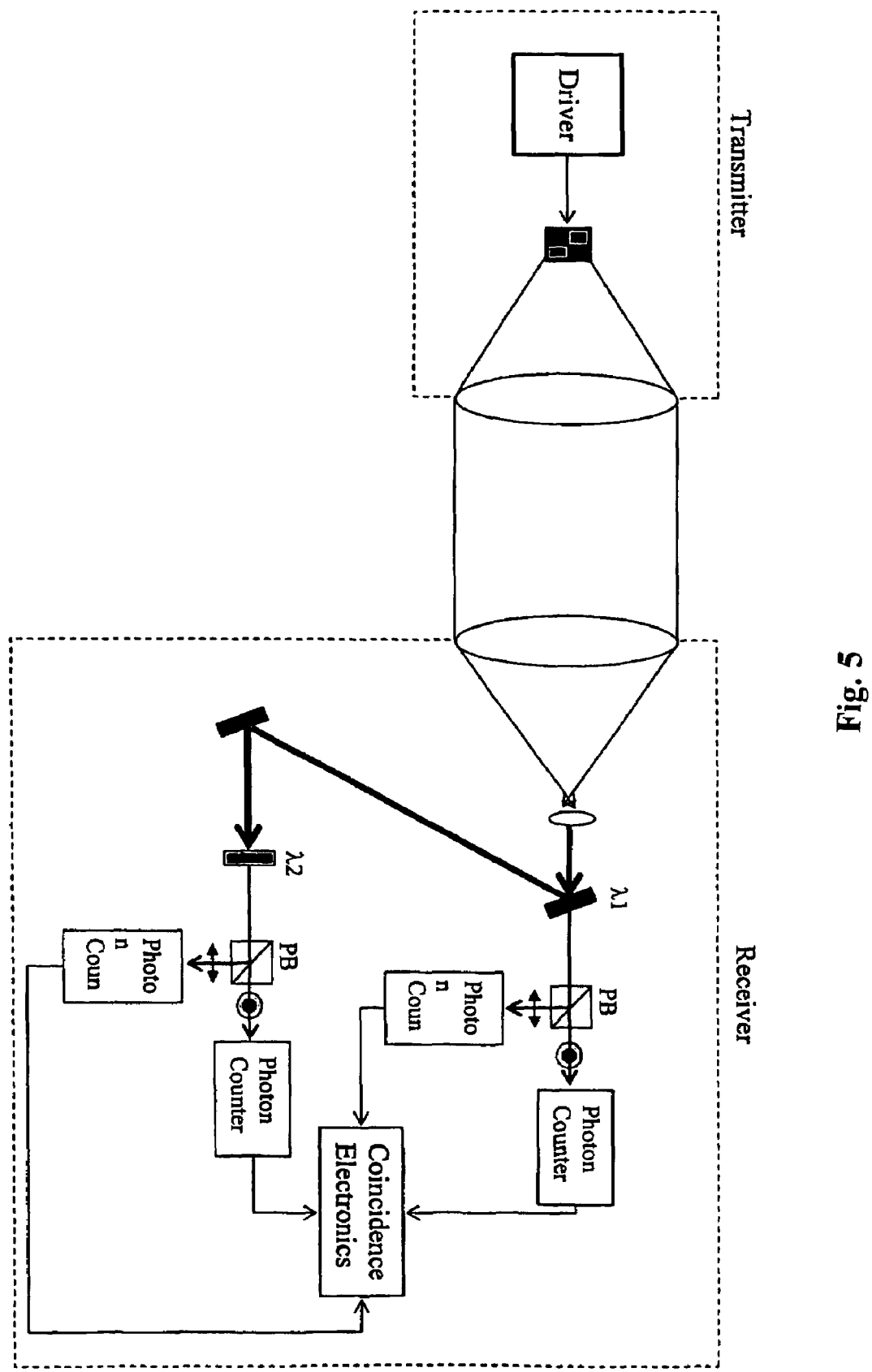
FIG. 5 illustrates a schematic of a transmitter working in conjunction with a receiver to provide communications, according to one embodiment of the present invention.

In the schematic shown in FIG. 5, the transmitter 500 is shown working in conjunction with a receiver 600. The driver 501 and emitters 502 described in FIG. 1 are shown within the transmitter 500, which also includes a lens 503 for directing the optical signal. The signal is transferred through free space, or an optical fiber, to the receiver 600. The receiver has a lens 601 to collect the photons and a filter system to send the photons of wavelength one to one set of photon counters 609-a and 609-b and the photons of wavelength two to a separate set of photon counters 609-c and 609-d, through the use of wavelength filters 602 and 604, in conjunction with a mirror 603. The photons of wavelength one are separated by a Polarization Beam Splitters (PBS) 606 into horizontal and vertical polarizations and then detected by photon counters 609. The photons of wavelength two are likewise separated 608 by polarization and detected. The coincidence electronics 610 determine which photon counters fire at the same time and thereby decode the data in bits of ones and zeros.

The present invention has extremely low maintenance as it can be built entirely on a single computer chip, so it will have the same reliability of a microchip. Additionally, due to the chip fabrication techniques, this device also provides advantages of mass production cost savings.

The present invention is unique in that it is the only known transmitter utilizing the information coding scheme in conjunction with traditional optical sources, such as LEDs and Laser Diodes. This system has the unique advantage of not requiring the use of a non-linear crystal and laser source for the generation of single-photon pairs for the purposes of time-coincident ('quasi time-entangled') communications.

Another advantage of this system is that it will enable the transmission of information at very low power levels and with a very small device. With the assumptions of 1% conversion efficiency of electrical to optical energy and 10% efficiency of transmission of optical energy from the transmitter to the receiver the transmitter will require only femtowatts of power per bit transmitted. This is an extremely low power transmitter. The calculated power levels are lower than any known transmitter. Another advantage of this system is that it can be fabricated on a single chip using conventional microchip fabrication technologies. This will make the system very compact and low-cost when manufactured in mass quantities.

While several applications for the present invention have been discussed above, the present invention is also applicable to other areas, as well. These include distributed communication networks, including local area networks, sensor networks and portable communications nodes. Also included is the area of secure communications, involving point-to-point communications where data security is important. The present invention is also applicable to optical interconnects that involve the transfer of data between chips on a circuit board, of between circuit boards in a system. The present invention also has applicability to long haul undersea telecommunications, where low power transmission may be crucial, and in redundant spacecraft communication, to allow for low power and low costs communication to be utilized.

Although the invention has been described based upon these preferred embodiments, it would be apparent to those skilled in the art that certain modifications, variations, and alternative constructions would be apparent, while remaining within the spirit and scope of the invention. In order to determine the metes and bounds of the invention, therefore, reference should be made to the appended claims.

The invention claimed is:

1. An optical communications transmitter comprising:
a oscillator source, producing a clock signal;
a data source, producing a data signal;
a modulating circuit for modulating the clock signal using the data signal to produce modulating signals;
optical drivers, receiving the modulating signals and producing optical driving signals based on the modulating signals; and
optical emitters, producing small numbers of photons based on the optical driving signals,
wherein the small numbers of photons are time-correlated between at least two separate optical transmission wavelengths and quantum states and the small number of photons can be detected by a receiver to reform the data signal.

2. The optical communications transmitter as recited in claim 1, wherein the transmitter is configured to transmit the small number of photons to the receiver through a polarization maintaining fiber.

3. The optical communications transmitter as recited in claim 1, wherein the transmitter is configured to transmit the small number of photons to the receiver through free space.

4. The optical communications transmitter as recited in claim 1, wherein the optical emitters comprise at least one of light emitting diodes and laser diodes.

5. The optical communications transmitter as recited in claim 1, wherein the optical emitters comprise at least one of quantum wells and quantum dots.

6. The optical communications transmitter as recited in claim 1, further comprising a random signal generator, where the clock signal is received by the random signal generator and produces a randomized clock signal to be provided to the modulating circuit; and
wherein the small number of photons comprise pseudo-entangled photons.

7. The optical communications transmitter as recited in claim 6, wherein the optical emitters produce the small numbers of photons which have both horizontal and vertical polarization states.

8. The optical communications transmitter as recited in claim 1, wherein the optical emitters produce the small number of photons having two wavelengths, with photons of a first wavelength of the two wavelengths having a single polarization state.

9. The optical communications transmitter as recited in claim 1, wherein the optical emitters produce the small number of photons having two wavelengths, with photons of a first wavelength of the two wavelengths having both horizontal and vertical polarization states.

10. The optical communications transmitter as recited in claim 1, wherein the small number of photons enable ultra low power communication between the transmitter and the receiver.

11. A method of ultra lower power communication between a transmitter and receiver, comprising:
modulating a clock signal using a data signal to produce modulating signals;
driving optical emitters, based on the modulating signals, to produce small numbers of photons;
transmitting the small number of photons to a receiver; and
detecting the small number of photons to reform the data signal,
wherein the small numbers of photons are time-correlated over at least two wavelengths and quantum states.

12. The method of ultra lower power communication as recited in claim 11, wherein the transmitting comprises transmitting the small number of photons to the receiver through a polarization maintaining fiber.

13. The method of ultra lower power communication as recited in claim 11, wherein the transmitting comprises transmitting the small number of photons to the receiver through free space.

14. The method of ultra lower power communication as recited in claim 11, wherein the driving of the optical emitters comprises driving at least one of light emitting diodes, laser diodes, quantum wells and quantum dots.

15. The method of ultra lower power communication as recited in claim 11, further comprising:
receiving the clock signal by a random signal generator;
producing a randomized clock signal based on the clock signal; and modulating the randomized clock signal using the data signal to produce the modulating signals,
wherein the small number of photons comprise pseudo-entangled photons.

16. The method of ultra lower power communication as recited in claim 11, wherein the driving of the optical emitters comprises producing the small number of photons having two wavelengths, with photons of a first wavelength of the two wavelengths having a single polarization state.

17. The method of ultra lower power communication as recited in claim 11, wherein the driving of the optical emitters comprises producing the small number of photons having two wavelengths, with photons of a first wavelength of the two wavelengths having both horizontal and vertical polarization states.

18. The system as recited in claim 11, wherein the transmitter is configured to produce the small number of photons having two wavelengths, with photons of a first wavelength of the two wavelengths having a single polarization state.

19. The system as recited in claim 11, wherein the transmitter is configured to produce the small number of photons having two wavelengths, with photons of a first wavelength of the two wavelengths having both horizontal and vertical polarization states.

20. A system for ultra lower power communication between a transmitter and receiver, comprising:
modulating means for modulating a clock signal using a data signal to produce modulating signals;
driving means for driving optical emitters, based on the modulating signals, to produce small numbers of photons;
transmitting means for transmitting the small number of photons to a receiver; and
detecting means for detecting the small number of photons to reform the data signal;
wherein the transmitter is configured to produce the small numbers of photons which are time-correlated between at least two separate optical transmission wavelengths and quantum states.

21. The system as recited in claim 20, wherein the transmitting means comprises means for transmitting the small number of photons to the receiver through a polarization maintaining fiber.

22. The system as recited in claim 20, wherein the transmitting means comprises means for transmitting the small number of photons to the receiver through free space.

23. The system as recited in claim 20 wherein the driving means comprises means for driving at least one of light emitting diodes, laser diodes, quantum wells and quantum dots.

24. The system as recited in claim 20, further comprising:
receiving means for receiving the clock signal by a random signal generator; and
producing means for producing a randomized clock signal based on the clock signal;
wherein the modulating means is configured to modulate the randomized clock signal using the data signal to produce the modulating signals and wherein the small number of photons comprise pseudo-entangled photons.

* * * * *